(12) United States Patent
Srinivasan

(10) Patent No.: US 7,495,673 B1
(45) Date of Patent: Feb. 24, 2009

(54) RESOURCE TEPEE

(76) Inventor: Shankar S Srinivasan, 602 Lancaster Ct., Belle Mead, NJ (US) 08502

( * ) Notice: Subject to any disclaimer, the term of this patent is extended or adjusted under 35 U.S.C. 154(b) by 391 days.

(21) Appl. No.: 11/144,960

(22) Filed: Jun. 4, 2005

(51) Int. Cl.
*G09G 5/00* (2006.01)
*G06T 11/20* (2006.01)
*G06F 3/00* (2006.01)

(52) U.S. Cl. .................. 345/619; 345/440; 715/712; 715/713

(58) Field of Classification Search ............... 345/440, 345/441, 619; 715/712, 713
See application file for complete search history.

(56) References Cited

U.S. PATENT DOCUMENTS

| | | | |
|---|---|---|---|
| 5,341,223 A | 8/1994 | Shigeeda et al. | |
| 5,450,535 A * | 9/1995 | North | 345/440 |
| 5,467,440 A | 11/1995 | Nihei | |
| 5,829,003 A | 10/1998 | Okura | |
| 6,369,819 B1 * | 4/2002 | Pitkow et al. | 345/440 |
| 6,509,898 B2 * | 1/2003 | Chi et al. | 345/440 |
| 6,615,182 B1 | 9/2003 | Powers et al. | |
| 2005/0027687 A1 * | 2/2005 | Nowitz et al. | 707/3 |

* cited by examiner

*Primary Examiner*—Chante Harrison
(74) *Attorney, Agent, or Firm*—Horst M. Kasper

(57) ABSTRACT

A color display called a Resource Tepee depicting, at a glance, resource utilization across functions and over levels of an organization. The display is constructed by starting with a resource utilization matrix whose elements are resources utilized at each combination of function and level. A matrix of co-ordinates is computed using the resource utilization matrix. This matrix contains the nodes of the Tepee. Boundary lines to separate the colors of the Tepee are obtained by connecting co-ordinates in each column of the matrix of co-ordinates. Colors representing distinct functions are applied to the spaces between boundary lines to obtain the Resource Tepee.

5 Claims, 1 Drawing Sheet
(1 of 1 Drawing Sheet(s) Filed in Color)

RESOURCE TEPEE

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The invention is a color coded display depicting resource utilization across the functions and levels of an organization and ties organizational structure to resource utilization.

2. Description of Related Art

The structure of organizations is often depicted using an organizational chart consisting of blocks and lines. The blocks contain the name and title of an employee and the lines define reporting relationships. An organizational chart tells us how personnel are distributed over various functions at different hierarchical levels within an organization. Enhancements pertaining to organizational charts are in U.S. Pat. No. 5,467,440 to Nehei (1995), U.S. Pat. No. 5,829,003 to Okura (1998) and U.S. Pat. No. 5,341,223 to Shigeeda et al. (1994). U.S. Pat. No. 6,615,182 to Powers et al. (2003) ties structure to performance evaluation. While the organizational chart provides an overview of manpower distribution it does not provide a visualization of other resources utilized. For instance, the manpower related payroll expenses are not reflected in an organizational chart. Further, another more intuitive representation of manpower distribution will be useful. The novel visual display described here can depict the utilization of any resource including manpower. The span of an organizational chart is limited by the smallest possible size of it's blocks and their contents. This is less of a limitation for the present invention.

BRIEF SUMMARY OF INVENTION

This invention maps data on resource utilization at various functions and at differing levels within the organization onto a color coded chart. This color coded chart is an easy to grasp depiction of resource utilization compared to raw data and it's mathematical transformations. If a color on the chart is dominant then the function associated with the color expends the resource to a larger extent. The process of generating the chart starts with a resource utilization matrix, from which a matrix of co-ordinates is obtained. The co-ordinates are the nodes of the Tepee. Following specified rules the nodes are connected and the trapezoidal and triangular parts obtained on connecting the nodes are colored to form the Resource Tepee.

DESCRIPTION OF THE DRAWINGS

The patent or application file contains at least one drawing executed in color. Copies of this patent or patent application publication with color drawing(s) will be provided by the Office upon request and payment of the necessary fee.

The attached drawings illustrate the process of constructing a resource Tepee.

DETAILED DESCRIPTION OF THE INVENTION

Figure 1:
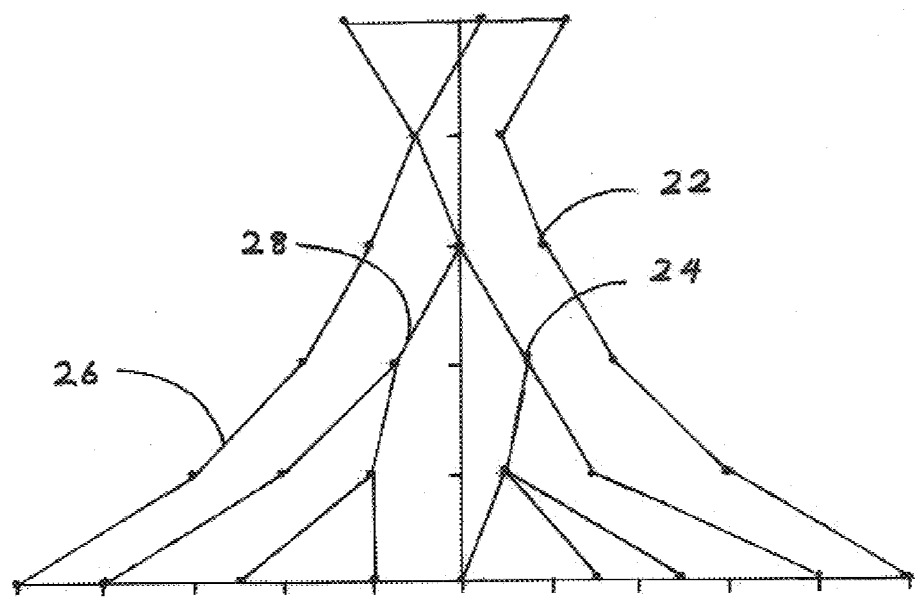
FIG. 1 shows the nodes of a Resource Tepee and the lines connecting nodes which separate the Tepee colors.

In this discussion, organizations are any commercial, non-profit or governmental collective entities, resources refer to costs, supplies or supports used to achieve organizational objectives and functions refers to coalitions within organizations typically professional groupings such as marketing, finance, R&D etc. Briefly, the process of constructing a Resource Tepee starts with a resource utilization matrix. This generates a matrix of co-ordinates whose elements are the nodes of the Tepee. The nodes of the Tepee are connected by lines going from the bottom to the top of the Tepee. The spaces between the lines are colored appropriately to generate the Resource Tepee. An example is interspersed within the detailed description that follows in order to illustrate the Resource Tepee.

Resource Utilization

The resource utilization matrix, denoted by L, will consist of element $l_{kj}$ which represent the resource utilization by the $k^{th}$ function at the $j^{th}$ level. The subscript k for the columns from the left to the right of the matrix varies from 1 for the first function to the last or $n^{th}$ function in some appropriate preselected order. Ideally the order would have functions within a larger grouping next to each other. The subscript j for the rows from the bottom to the top of the matrix varies from 0 for the bottom most in the hierarchy to some highest level m. An example with a resource utilization matrix follows:

Example: Consider a hypothetical project involving 6 levels and 8 functions. The resource of interest is the number of personnel required to execute a project. Note that the resource could very well have been the payroll expenses or any of the myriad costs of running an enterprise. The resource utilization matrix follows:

$$L = \begin{bmatrix} 3 & 0 & 0 & 0 & 0 & 0 & 0 & 2 \\ 0 & 0 & 0 & 0 & 0 & 0 & 0 & 2 \\ 2 & 0 & 0 & 0 & 0 & 0 & 0 & 2 \\ 2 & 0 & 0 & 3 & 0 & 0 & 0 & 2 \\ 2 & 2 & 0 & 3 & 0 & 0 & 2 & 3 \\ 2 & 3 & 3 & 2 & 3 & 2 & 3 & 2 \end{bmatrix}$$

To clarify the notation note for instance that $I_{42}$ is the head count for the $4^{th}$ function at the $2^{nd}$ level in the hierarchy. From the matrix $I_{42}$ is 3. Similarly $I_{60}$ is the number of personnel for the $6^{th}$ function at the $0^{th}$ or bottom level and equals 2, $I_{51}=0$. Notice that the top rows of the matrix tend to have more zeroes as one might expect as there tends to be fewer personnel at higher levels in an organization's hierarchy.

Computing Co-ordinates

The next step in the process computes a matrix C of co-ordinates. This matrix contains the elements $c_{ij}$ given by $$c_{ij} = \left\{ \left( \sum_{k \leq i} l_{kj} - 0.5 * \sum_{k=1}^{n} l_{kj} \right), a * j \right\}$$

where $\Sigma$ is a symbol for a summation and a is some appropriate amount by which we would like the hierarchical levels in the Tepee to be separated. A comma separates the x co-ordinate from the y co-ordinate. The subscript i for the columns from left to right of the matrix C varies from 0 to n and represents the n+1 boundaries which will separate the colors of the Tepee. The subscript j for the rows from bottom to top of the matrix C varies as before from 0 for the bottom most to the highest level m. The $l_{kj}$ are the elements of the resource utilization matrix as defined earlier. The co-ordinates in C are the nodes of the Tepee.

To clarify the computation of the C matrix let's return to our example. For the resource utilization matrix in our example the matrix C of Tepee co-ordinates computes as $$\begin{bmatrix} (-2.5, 5) & (0.5, 5) & (0.5, 5) & (0.5, 5) & (0.5, 5) & (0.5, 5) & (0.5, 5) & (0.5, 5) & (2.5, 5) \\ (-1, 4) & (-1, 4) & (-1, 4) & (-1, 4) & (-1, 4) & (-1, 4) & (-1, 4) & (-1, 4) & (1, 4) \\ (-2, 3) & (0, 3) & (0, 3) & (0, 3) & (0, 3) & (0, 3) & (0, 3) & (0, 3) & (2, 3) \\ (-3.5, 2) & (-1.5, 2) & (-1.5, 2) & (-1.5, 2) & (1.5, 2) & (1.5, 2) & (1.5, 2) & (1.5, 2) & (3.5, 5) \\ (-6, 1) & (-4, 1) & (-2, 1) & (-2, 1) & (1, 1) & (1, 1) & (1, 1) & (3, 1) & (6, 1) \\ (-10, 0) & (-8, 0) & (-5, 0) & (-2, 0) & (0, 0) & (3, 0) & (5, 0) & (8, 0) & (10, 0) \end{bmatrix}$$

Let's verify $c_{21}$. Using the formula this co-ordinate is given by $$c_{21} = \left\{ \left( \sum_{k \leq 2} l_{k1} - 0.5 * \sum_{k=1}^{8} l_{k1} \right), a * 1 \right\}$$

The quantity $$\sum_{k \leq 2} l_{k1}$$

is the sum of the resources utilized at the $1^{st}$ tier for the first 2 functions. Using the L matrix this is equal to 2+2=4. The quantity $$\sum_{k=1}^{8} l_{k1}$$

is the sum over all functions in the $1^{st}$ tier. This equals 2+2+3+2+3=12. Using a=1

$$c_{21} = \{(4-0.5*12), 1\} = (-2, 1)$$

Similarly consider $$c_{43} = \left\{ \left( \sum_{k \leq 4} l_{k3} - 0.5 * \sum_{k=1}^{8} l_{k3} \right), a * 3 \right\}$$

$$= \{(2 - 0.5*(2+2)), 3\} = (0, 3)$$

Note that for i=0 the first summation drops out and $$c_{0j} = \left\{ -0.5 * \sum_{k=1}^{8} l_{kj}, a * j \right\}$$

Constructing the Tepee

The co-ordinates in the matrix C in our example are plotted in FIG. 1. In FIG. 1 the x axis is a scale from −10 to 10 with tick marks 2 units apart. The y axis is a scale from 0 to 5 with tick marks 1 unit apart. Points 22 and 24 are two nodes of the Tepee. Once the nodes have been plotted the boundaries between colors are obtained by connecting the co-ordinates in each column of the matrix of co-ordinates. For instance, line 26 in FIG. 1, the outer left boundary of the Tepee, is obtained by tracing a line through the co-ordinates (−10,0), (−6,1), (−3.5,2), (−2,3), (−1,4) and (−2.5,5) in the first column of C. Line 28, which is the second line from the left, is obtained by connecting (−8,0), (−4,1), (−1.5,2), (0,3), (−1,4) and (0.5,5) in the second column of C. Proceeding in this manner through all the columns of C in our example we obtain all the boundary lines in FIG. 1. Notice that the lines coalesce as they approach the upper end of the Tepee. This is due to the zero resource utilization cells in our resource utilization matrix.

Figure 2:
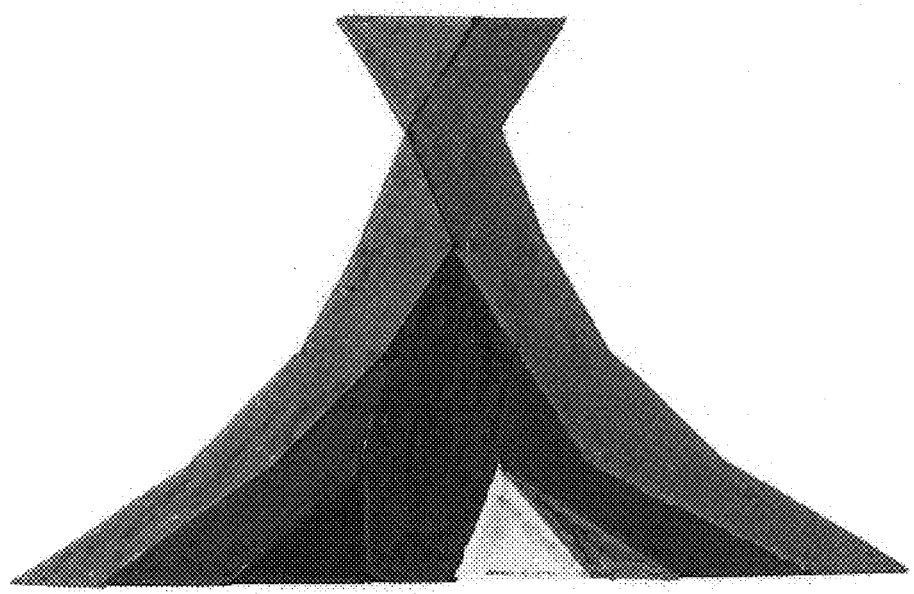
FIG. 2 is a finished Resource Tepee.

Once the boundary lines are obtained we associate n distinct colors to the n functions. Starting from the left we fill in the space between the boundary lines with colors going from that for the $1^{st}$ function to that for the last or $n^{th}$ function. In our example we chose light blue for the $1^{st}$ function, red for the $2^{nd}$ function, dark blue for the $3^{rd}$ function, brown for the $4^{th}$ function, yellow for the $5^{th}$ function, green for the $6^{th}$ function, pink for the $7^{th}$ function and orange for the $8^{th}$ function. Using these colors the Tepee in FIG. 2 is obtained.

Variants

A variant on the Tepee is obtained when the following expression is used for the elements of the matrix of co-ordinates instead of the one provided earlier $$c_{ij} = \left\{ \sum_{k \leq i} l_{kj}, a * j \right\}$$

One would proceed as before by computing the matrix of co-ordinates, drawing the boundary lines separating colors and then coloring the space between the lines. A one sided Tepee results. The Tepee centered and flared on both sides as in FIG. 2 is the preferred embodiment. There are variants on the method such as switching of row and column and the manner of indexing which will yield essentially the same results. Means of marking other than color may be used. Some users, especially when seeking to implement the method using a computer, may refer to the matrices as arrays.

CONCLUSIONS

The advantages of the Tepee are apparent from FIG. 2. The Tepee is easy to interpret. The extent and location of the colors tell us the extent to which the resources are expended and at what level in the organization. The Tepee can be constructed for any resource whose use can be partitioned across functions and levels. The Tepee has broad utility. For instance, resources could include any quantifiable financial activity in an organization. Functions of interest could be professional groupings as well as coalitions centered around products, locations and markets. Further one could construct Tepees for an organization as a whole or restrict the display to business units, processes or projects. Thus, the detail in the description and example should not be construed as limits to the scope of this invention.

What is claimed is:

1. A method of constructing a visual display of resource utilization, comprising the steps of:
    assessing resource utilization depending on specific resources as functions and on levels of operation;
        creating a resource utilization matrix L with elements $l_{kj}$ with k representing n dimensions and with j representing m+1 dimensions and indexed by function (k) and level (j);
        calculating a matrix C of co-ordinates from said resource utilization matrix L;
        plotting co-ordinates of said matrix C of co-ordinates on a display;
        drawing lines through the co-ordinates plotted on the display;
    marking each space between said lines drawn with a distinct marking for a different function;
    presenting said co-ordinates, said lines and said markings on a display, wherein the display is constructed for summarizing at a glance the various functions and levels at which the resources of interest are expended; and
    wherein the co-ordinate matrix C has a co-ordinate matrix elements $c_{ij}$, wherein i represents n+1 dimensions and wherein j represents m+1 dimensions.

2. The method according to claim 1 wherein the co-ordinate matrix elements $c_{ij}$ are obtained according to the formula $$c_{ij} = \left\{ \left( \sum_{k \leq i} l_{kj} - 0.5 * \sum_{k=1}^{n} l_{kj} \right), a * j \right\}$$

wherein i varies between 0 and n;
wherein j varies between 0 and m;
wherein k varies between 1 and n;
wherein a is some appropriate amount by which hierachical levels are separated according to the co-ordinate matrix.

3. The method according to claim 1 wherein the co-ordinate matrix elements $c_{ij}$ are obtained according to the formula $$c_{ij} = \left\{ \left( \sum_{k \leq i} l_{kj} \right), a * j \right\}$$

wherein i varies between 0 and n;
wherein j varies between 0 and m;
wherein k varies between 1 and n;
wherein a is some appropriate amount by which hierachical levels are separated according to the co-ordinate matrix.

4. The method according to claim 1, further comprising drawing lines through co-ordinates for each function of said matrix of co-ordinates.

5. The method according to claim 1 further comprising employing colors for distinguishing marking of distinct functions.

* * * * *